United States Patent
Klimes

(10) Patent No.: US 7,555,902 B2
(45) Date of Patent: Jul. 7, 2009

(54) TANDEM MASTER CYLINDER WITH CENTRAL VALVES

(75) Inventor: Milan Klimes, Oxford, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 257 days.

(21) Appl. No.: 11/803,951

(22) Filed: May 16, 2007

(65) Prior Publication Data

US 2008/0282697 A1    Nov. 20, 2008

(51) Int. Cl.
*F15B 7/08* (2006.01)
*B60T 11/28* (2006.01)
(52) U.S. Cl. ....................................................... 60/589
(58) Field of Classification Search ................... 60/585, 60/588, 589
See application file for complete search history.

(56) References Cited

U.S. PATENT DOCUMENTS

| | | | |
|---|---|---|---|
| 4,939,901 A | 7/1990 | Saalbach et al. | |
| 5,005,350 A | 4/1991 | Reinartz et al. | |
| 5,014,514 A | 5/1991 | Reinartz et al. | |
| 5,179,834 A * | 1/1993 | Rauschenbach | 60/589 |
| 5,449,225 A * | 9/1995 | Burgdorf et al. | 60/589 |
| 6,065,292 A | 5/2000 | Unterberg | |

* cited by examiner

*Primary Examiner*—Michael Leslie

(57) ABSTRACT

A tandem master cylinder (1) with central valves has ball-shaped valve members (25, 40) with leaf springs (26, 41) serving as valve springs. The ball-shaped valve members (25, 40) can be manufactured of a plastic material, coated with an elastomer. The size of the balls is preferably adjusted to the size of the pistons (4, 5) to allow a maximum flow while ensuring at the same time that the piston walls retain a thickness. The leaf springs (26, 41) have a bowl-shaped body (61), which is shaped like a partial sphere. To avoid an entrapment of brake fluid or a vacuum between the balls (25, 40) and the leaf springs (26, 41), respectively, a central hole (62) has been provided in the bowl-shaped body (61). The leaf springs (26, 41) are equipped with a plurality of tongue-shaped extremities (63) extending radially outward with end portions (64) bent toward the axial side on which the valve members (25, 40) are located.

7 Claims, 1 Drawing Sheet

TANDEM MASTER CYLINDER WITH CENTRAL VALVES

BACKGROUND OF THE INVENTION

The present invention relates to a tandem master cylinder with central valves for hydraulic brake systems of automotive vehicles.

Such a master cylinder is known from U.S. Pat. No. 4,939,901. The master cylinder described therein contains a central valve each both in the primary and secondary master cylinder piston. In the inactive position, i.e. when the vehicle's brake pedal is not depressed, the central valves, each comprising a valve seat, a valve member, a cylindrical valve spring biasing the valve member, and a valve stem connected to the valve member, are held open by cylinder pins abutting the valve stems. When the tandem master cylinder is actuated, the pistons move so that the valve seats are moved away from the pins and the central valves close in order to enable a pressure-build-up in the pressure chambers of the master cylinder.

The concept of central valves with valve stems is more durable under high pressure than other types of master cylinders. However, the design requires an increase in length of the master cylinder housing due to the elements that need to be accommodated, for instance the valve stems and cylindrical valve springs. However the packaging space under the hood of a car is limited, and a smaller build of any component would be a great advantage. Additionally, the flow of brake fluid through open central valves is rather small and determined by the cross-section of the valve opening and the shape of the passage in connection with the mushroom-shaped valve member, which causes turbulences in the fluid.

It is an object of the present invention to provide a tandem master cylinder which allows for a shorter build and which is more cost-effective to manufacture. Additionally, it is desirable to optimize the flow through the vale opening.

SUMMARY OF THE INVENTION

This objective is achieved by a master cylinder of the above-mentioned kind with ball-shaped valve members and with leaf springs serving as valve springs.

The ball-shaped valve members can be manufactured of a plastic material, coated with an elastomer, i.e. a rubber-like material. This provides for a low-cost solution. But other materials, including steel, are suitable as well.

The ball-shaped valve member itself can abut the cylinder pin, which shortens the required length of the master cylinder housing by omitting the valve stem. The size of the ball is preferably adjusted to the size of the piston to allow a maximum flow while ensuring at the same time that the piston walls retain a thickness sufficient for passing all load tests. For optimal flow performance, the ball can be designed to the maximum possible size that fits into the pistons. Its round shape reduces turbulences in the brake fluid passing the valve member. With one size of the ball, all standard sizes of tandem master cylinders can be covered. It is also possible to design one standard ball that fits a whole range of tandem master cylinder sizes with the possible disadvantage that the optimum flow performance for larger tandem master cylinders may not be achieved.

Compared to a cylindrical valve spring, using a leaf spring as a valve spring will further decrease the length of the master cylinder. The leaf spring of the invention is designed with a spherical center area adapted to the ball-shaped valve member for centering purposes. To avoid an enclosure of brake fluid between the ball and the leaf spring a hole is provided in the center area of the spring.

Further details and advantages will be evident from the following description of an embodiment of the invention.

DETAILED DESCRIPTION OF THE DRAWINGS

Figure 1:
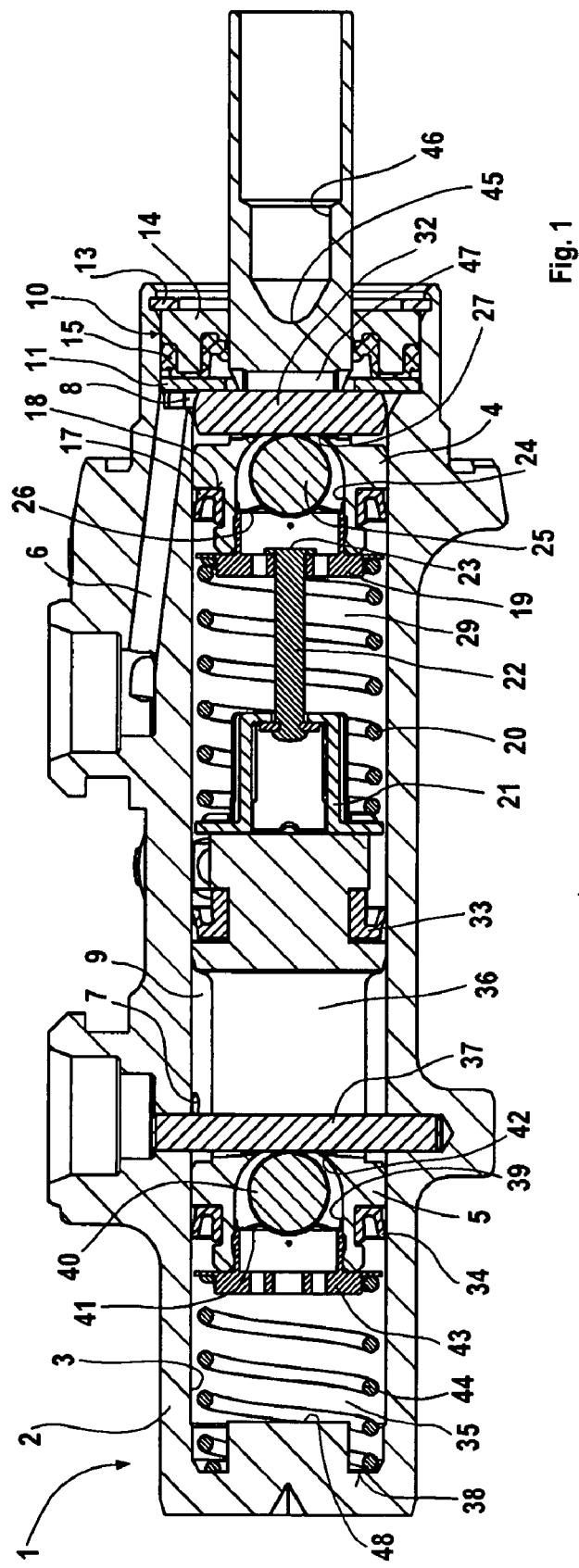
FIG. 1 shows a sectional view of a tandem master cylinder embodying the present invention.

The tandem master cylinder 1, shown in FIG. 1, comprises a housing 2 with a bore 3 and with a first piston 4 and a second piston 5 arranged therein. Supply channels 6, 7 extend from a supply reservoir (not illustrated) and terminate respectively in the supply chambers 8 and 9, disposed behind primary and secondary sleeves 17 and 34, respectively. The supply chamber 8 is sealed, in relation to the atmosphere, by virtue of a sealing assembly 10. Sealing assembly 10 comprises a guide ring 14 having a sealing sleeve 15, disposed on its axial end on the fluid side. The sealing sleeve 15 has two sealing radii, thus confining the supply chamber 8 on the radially inner and outer surfaces of the guide ring 14, thereby sealing it from the atmosphere. Sealing assembly 10 is bounded by a disc 11 on the fluid side of the sealing assembly 10 and by a guard ring 13 on its atmospheric side. When viewed in the drawing, piston 4 is preloaded to the right. Via the disc 11 and the sealing assembly 10, piston 4 is secured in the bore 3 by the guard ring 13.

As a piston seal, the first piston 4 carries primary sleeve 17 which is axially and radially secured in an annular groove 18 of the first piston 4. Bearing against the pressure side of the first piston 4 (the left end in the Figure) via a support member 19 is a first piston-resetting spring 20 which is designed as a compression spring. Spring 20 is seated at its opposite end against a radial annular surface of a spring retainer 21. The first piston-resetting spring 20 is retained between the spring retainer and the support member 19 by means of a rod-shaped central clamping bolt 22. The clamping bolt 22 projects axially freely through an aperture in the end of the support member 19, to abut on the other side of support member 19 with a head 23. The other end of bolt 22 projects through a center hole in the spring retainer 21, where it is prevented from slipping out by means of a clamp. The spring retainer 21 abuts the second piston 5 but is not connected to it.

A partly spherical recess 24 is formed in the first piston 4, facing second piston 5, and accommodating a ball-shaped valve member 25 therein. Also disposed in the recess 24 is valve spring 26 which is a leaf spring shown in greater detail in FIG. 2. It urges the valve member 25 to the right, as viewed in the drawing, in the direction of a valve seat 27 on piston 4. The outer extremities of spring 26 are guided by the walls of the recess 24 and seated on the support member 19, which is snap-fitted into the recess 24 and thus connected to the piston 4. The opening in the valve seat 27 connects the supply chamber 8 with a first pressure chamber 29 formed between the first and the second pistons 4, 5. The first pressure chamber 29 communicates, via a non-illustrated pressure line, with a hydraulic actuating device such as a wheel cylinder of a brake or a hydraulically actuable clutch slave cylinder of an automotive vehicle.

The valve member 25 abuts on a cylindrical stop pin 32 extending radially through piston 4 via a slot 47. Bearing against the stop pin 32 is first piston 4 which, in turn, via the disc 11 and the sealing assembly 10, is supported by the guard ring 13 on the housing. In the illustrated initial position of the tandem master cylinder 1, the valve member 25 is displaced from sealing seat 27 by the stop pin 32 so that the first valve is opened.

The second piston 5 is provided with a first sealing sleeve 33 which seals relative to first pressure chamber 29, and with a secondary sealing sleeve 34 which seals in a pressure-tight manner to isolate a second pressure chamber 35 from the supply chamber 9. Between the first sealing sleeve 33 and the secondary sleeve 34, a slot 36 is formed in the second piston 5 in which a cylindrical clamping pin 37 extends radially across bore 3 and is secured in the housing 2. The length of slot 36 is sized such that the second piston 5, is allowed to move to the left until the support member 43 abuts at a stop 48 protruding from the bottom 38 of bore 3.

The second piston 5 incorporates a partially spherical recess 39 extending through piston 5, open towards the second pressure chamber 35 to accommodate a second ball-shaped valve member 40. As in the first piston 4, the recess 39 forms a valve seat 42 where it enters into the slot 36 so that the second pressure chamber 35 is in contact with the supply chamber 9 when the valve member 40 is lifted off the valve seat 42. Valve member 40 has a leaf spring serving as a valve spring 41 abutting thereon and against a second support member 43, which holds it in place in recess 39.

Valve member 40 abuts, with its right-hand end, when viewed in the drawing, on clamping pin 37. A second piston-resetting spring 44, having a lower spring rate than the first piston-resetting spring 20, is arranged between the second piston 5 and the bottom 38 of bore 3.

In the illustrated release position of the tandem master cylinder 1, the second piston-resetting spring 44 urges the second piston 5 against the clamping pin 37 so that the left slot end surface of second piston 5 abuts against the clamping pin 37. Unlike the first piston-resetting spring 20, the second piston-resetting spring 44 is not retained but is seated between the second piston 5 and the bottom 38 of bore 3.

At its outer end, on the right-hand side as viewed in the drawing, the first piston 4 contains a blind-end bore 46, open to the right, with a half-shell shaped recess 45 which is directed towards the open end of the blind-end bore 46. The recess 45 and the blind-end bore 46 serve to accommodate a push rod (not shown) of and actuating device such as a brake booster connected to a brake pedal.

The ball-shaped valve members 25 and 40 are made of plastic material coated with a rubber-like material durable enough to withstand high-pressure operation over an extended period of time. Their size is chosen to allow for a large opening in the valve seats 27 and 42 while allowing a large open cross-section on their radial outsides for optimum fluid passage. In the shown example, the diameter of the valve members 25 and 40 exceeds one third of the diameter of the bore 3. The radius of the recesses 24 and 39 is ideally chosen to be as large as possible while leaving a sufficient piston wall thickness.

The recesses 24 and 39 accommodating the valve members are shown to be spherical but may as well have a conical shape. A conical shape may be easier to manufacture. Care should be taken, however, that the opening angle of the conical shape is sufficiently large in order to avoid that the ball is squeezed into the cone and possibly jammed. A spherical shape of the recess with a radius greater than the valve member radius prevents this situation. Another advantage is that the flow area past the valve member will be increased. Regardless of the shape, the short guidance due to the recesses 24 and 39 in the pistons 4 and 5 and the ball-shaped valve members 25 and 40 reduce the flow resistance in the pistons 4 and 5.

Figure 2:
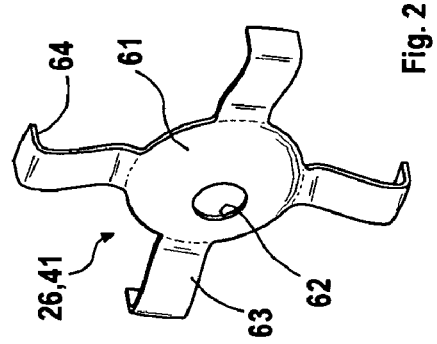
FIG. 2 shows the leaf spring serving as a valve spring in closer detail.

In reference to FIG. 2, the leaf springs 26 and 41 have a bowl-shaped body 61, which is shaped like a partial sphere and adapted to the outer surface of the ball-shaped valve members 25 and 40. To avoid an entrapment of brake fluid or a vacuum between the balls and the leaf springs 26 and 41, respectively, a central hole 62 has been provided in the bowl-shaped body. The leaf springs 26 and 41 are held in position by the support members 19 and 43, to which end the springs 26 and 41 are equipped with a plurality of tongue-shaped extremities 63 extending radially outward with end portions 64 bent toward the axial side on which the valve members are located. Although four extremities 63 are shown, any other numbers or shapes of extremities, even interconnected radial struts, are possible as long as a sufficient open cross-section is provided for the flow of fluid. The leaf springs are easy to manufacture from sheet metal as cold-formed parts.

The operation of the tandem master cylinder according to the present invention is similar to the function of known tandem master cylinders. In its shown resting position, the cylindrical pins 32 and 37 keep the valve members 25 and 40 away from the valve seats 27 and 42, thereby establishing a fluid connection between the supply channel 6 and the pressure chamber 29 on the one hand and the supply channel 7 and the pressure chamber 35 on the other hand. When piston 4 is moved toward the left in FIG. 1, the full width of slot 47 becomes available to the stop pin 32 so that the valve spring 26 is initially able to keep the valve member 25 and, indirectly, the stop pin 32 in their currently shown position in abutment at the disc 11 so that the valve member 25 will rest on valve seat 27. Spring 20 has a higher stiffness than spring 44. Thus, the second piston 5 will move to the left at the same time as piston 4. The valve seat 42 moves away from the clamping pin 37, thereby allowing the valve member 40 to be seated on the valve seat 42. Both connections of the pressure chambers 29 and 35 to their respective supply channels 6 and 7 are thereby shut simultaneously, and any further movement of the pistons 4 and 5 toward the left will increase the pressure in the pressure chambers 29 and 35. Since the stop pin 32 subsequently moves in the bore along with the first piston 4, the piston stroke is not limited to the width of slot 47.

What is claimed is:

1. A tandem master cylinder (1) for an automotive hydraulic brake system including a housing (2) having a bore (3), a first and a second piston (4, 5) slidably arranged in the bore (3) to define a first pressure chamber (29) between the first and second pistons (4, 5) and a second pressure chamber (35) between the second piston (5) and one end (38) of the bore (3), first and second stops (32, 37) in the housing (2) respectively engageable with the first and second pistons (4, 5) to define respective rest positions, first and second valves (25, 26, 27; 40, 41, 42) located respectively inside the first and second pistons (4, 5) for hydraulically connecting the first and second pressure chambers (29, 35) to an unpressurized supply chamber (8, 9) when the first and second pistons (4, 5) are engaged with their respective first and second stops (32, 37) and movable to respective closed positions sealing the first and second pressure chambers (29, 35) upon movement of the first and second pistons (4, 5) out of engagement with the first and second stops (32, 37), wherein at least one of the first and second valves (25, 26, 27; 40, 41, 42) comprises a ball-shaped valve member (25, 40) which contacts one of the stops (32, 37) when the piston (4, 5) accommodating the valve member (25, 40) is resting on its respective stop (32, 37).

2. The tandem master cylinder according to claim 1, wherein the ball shaped valve member (25, 40) is biased toward the stop (32, 37) by means of a leaf spring (26, 41).

3. The tandem master cylinder according to claim 2, wherein the leaf spring (26, 41) has a bowl-shaped body (61) and is equipped with a plurality of tongue-shaped extremities (63) extending radially outward.

4. The tandem master cylinder according to claim 2, wherein the leaf spring (26, 41) has a central hole (62).

5. The tandem master cylinder according to claim 1, wherein the valve member (25, 40) is accommodated in a recess (24, 42) inside one of the pistons (4, 5) and wherein the recess (24, 42) has a partially spherical shape.

6. The tandem master cylinder according to claim 1, wherein the valve member (25, 40) is made of a plastic material with an elastomeric coating.

7. The tandem master cylinder according to claim 1, wherein the valve member (25, 40) has a diameter exceeding one third of the diameter of the bore (3).

* * * * *